United States Patent
Song et al.

(10) Patent No.: US 10,169,656 B2
(45) Date of Patent: Jan. 1, 2019

(54) VIDEO SYSTEM USING DUAL STAGE ATTENTION BASED RECURRENT NEURAL NETWORK FOR FUTURE EVENT PREDICTION

(71) Applicant: NEC Laboratories America, Inc., Princeton, NJ (US)

(72) Inventors: Dongjin Song, La Jolla, CA (US); Haifeng Chen, West Windsor, NJ (US); Guofei Jiang, Princeton, NJ (US); Yao Qin, Princeton, NJ (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 15/688,131

(22) Filed: Aug. 28, 2017

(65) Prior Publication Data

US 2018/0060666 A1    Mar. 1, 2018

Related U.S. Application Data

(60) Provisional application No. 62/380,627, filed on Aug. 29, 2016, provisional application No. 62/384,790, filed on Sep. 8, 2016.

(51) Int. Cl.
*G06K 9/00* (2006.01)
*G06N 3/02* (2006.01)
*G06F 17/18* (2006.01)
*G06F 15/18* (2006.01)
(Continued)

(52) U.S. Cl.
CPC ......... *G06K 9/00718* (2013.01); *G06F 15/18* (2013.01); *G06F 17/18* (2013.01);
(Continued)

(58) Field of Classification Search
CPC ...... G06N 3/0445; G06N 99/005; G06N 3/02; G06N 3/049; G06N 3/04;
(Continued)

(56) References Cited

U.S. PATENT DOCUMENTS

2017/0206464 A1*   7/2017   Clayton ............... G06N 99/005

OTHER PUBLICATIONS

Chen, "Narx-Based Nonlinear System Identification Using Orthogonal Least Squares Basis Hunting", IEEE Transactions on Control Systems Technology, Jan. 2008, vol. 16, No. 1, pp. 78-84.
(Continued)

*Primary Examiner* — Kenny Cese
(74) *Attorney, Agent, or Firm* — Joseph Kolodka

(57) ABSTRACT

Systems and devices including an imaging sensor to capture video sequences in an environment having safety concerns therein. The systems and devices further including a processor to generate driving series based on observations from the video sequences, and generate predictions of future events based on the observations using a dual-stage attention-based recurrent neural network (DA-RNN). The DA-RNN includes an input attention mechanism to extract relevant driving series, an encoder to encode the extracted relevant driving series into hidden states, a temporal attention mechanism to extract relevant hidden states, and a decoder to decode the relevant hidden states. The processor further generates a signal for initiating an action to machines to mitigate harm to items.

20 Claims, 7 Drawing Sheets

(51) Int. Cl.
*G08B 23/00* (2006.01)
*G08B 31/00* (2006.01)
*G06F 17/30* (2006.01)
*G06N 3/04* (2006.01)
*G06Q 10/06* (2012.01)

(52) U.S. Cl.
CPC .......... *G06K 9/00744* (2013.01); *G06N 3/04* (2013.01); *G08B 23/00* (2013.01); *G08B 31/00* (2013.01); *G06F 17/30392* (2013.01); *G06K 2009/00738* (2013.01); *G06N 3/02* (2013.01); *G06N 3/049* (2013.01); *G06Q 10/06375* (2013.01); *G06T 2207/20084* (2013.01)

(58) Field of Classification Search
CPC ...... G06T 2207/20084; G06K 9/00718; G06K 9/00744; G06F 17/18; G06F 15/18; G08B 23/00; G08B 31/00
See application file for complete search history.

(56) References Cited

OTHER PUBLICATIONS

Cho, "On the Properties of Neural Machines Translation: Encoder-Decoder Approaches", Proceedings of SSST-8, Eight Workshop on Syntax, Semantics and Structure in Statistical Translation, Oct. 2014, pp. 103-111.

Cho, "Learning Phrase Representations Using RNN Encoder-Decoder for Statistical Machine Translation", Conference on Empirical Methods in Natural Language Processing, Sep. 2014, pp. 1-15.

Diaconescu, "The Use of NARX Neural Networks to Predict Chaotic Time Series", WSEA Transactions on Computer Research, Issue 3, vol. 3, Mar. 2008, pp. 182-191.

Qin, "A Dual Stage Attention based Recurrent Neural Network", International Joint Conference on Artificial Intelligence (IJCAI), 2017, pp. 1-7.

\* cited by examiner

VIDEO SYSTEM USING DUAL STAGE ATTENTION BASED RECURRENT NEURAL NETWORK FOR FUTURE EVENT PREDICTION

RELATED APPLICATION INFORMATION

This application claims priority to 62/380,627, filed on Aug. 29, 2016, incorporated herein by reference in its entirety, and 62/384,790, filed on Sep. 8, 2016, incorporated herein by reference in its entirety. This application is related to an application entitled "DUAL STAGE ATTENTION BASED RECURRENT NEURAL NETWORK FOR TIME SERIES PREDICTION", having, and which is incorporated by reference herein in its entirety.

BACKGROUND

Technical Field

The present invention relates to systems and methods for time series prediction and more particularly for systems and methods for a dual-stage attention-based recurrent neural network for time series prediction.

Description of the Related Art

Multivariate time series prediction is a field of endeavor that can benefit many real world application, such as visual object tracking, financial market prediction, medical diagnosis, weather forecasting, communication network traffic forecasting, machine translation, speech recognition and others. However, many of these applications cannot be properly modeled with linear techniques such as autoregressive moving-average (ARMA) or autoregressive integrated moving average (ARIMA) models because they do not exhibit simple regularities in temporal variations. Nor can conventional models differentiate among exogenous (driving) input terms.

However, efforts to develop non-linear autoregressive exogenous (NARX) models have so far proven ineffective at properly modelling complex data sets. In particular, previous efforts have been unable to solve two main challenges of NARX modelling; (1) selecting the relevant driving series for making predictions (especially for a large number of driving series), and (2) capturing the temporal dependencies, particularly in systems having long range dependencies. Because the encoder reads inputs into fixed length vectors, performance of the RNN will degrade as input lengths increase.

SUMMARY

According to an aspect of the present principles, a device for deo-based workplace safety. The systems and device including an imaging sensor to capture video sequences in an environment having safety concerns therein. A processor to generate driving series based on observations from the video sequences. The processor further generates predictions future events based on the observations using a dual-stage attention-based recurrent neural network (DA-RNN). The DA-RNN includes an input attention mechanism to extract relevant driving series, an encoder to encode the extracted relevant driving series into hidden states, a temporal attention mechanism to extract relevant hidden states, and a decoder to decode the relevant hidden states. The processor further generates a signal for initiating an action to machines to mitigate harm to items.

According to another aspect of the present principles, a video camera system is provided for performing video-based workplace safety. The system includes video cameras. Each video camera including one or more imaging sensor to capture video sequences in a workplace environment having machines therein, and a processor. The processor generates, using a DA-RNN, driving series based on observations, wherein the observations include (i) a subject, (ii) an action taken by the subject, and (iii) an object on which the subject is taking the action on, wherein the subject and object are constant. The processor further generates predictions of future events including future fire hazards based on the observations using a dual-stage attention-based recurrent neural network (DA-RNN). The DA-RNN includes an input attention mechanism to extract relevant driving series using an input attention mechanism, an encoder to encode the extracted relevant driving series into hidden states, a temporal attention mechanism to extract relevant hidden states, and a decoder to decode the relevant hidden states. The processor further generates a signal for initiating an action to the machine s to mitigate harm to items.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
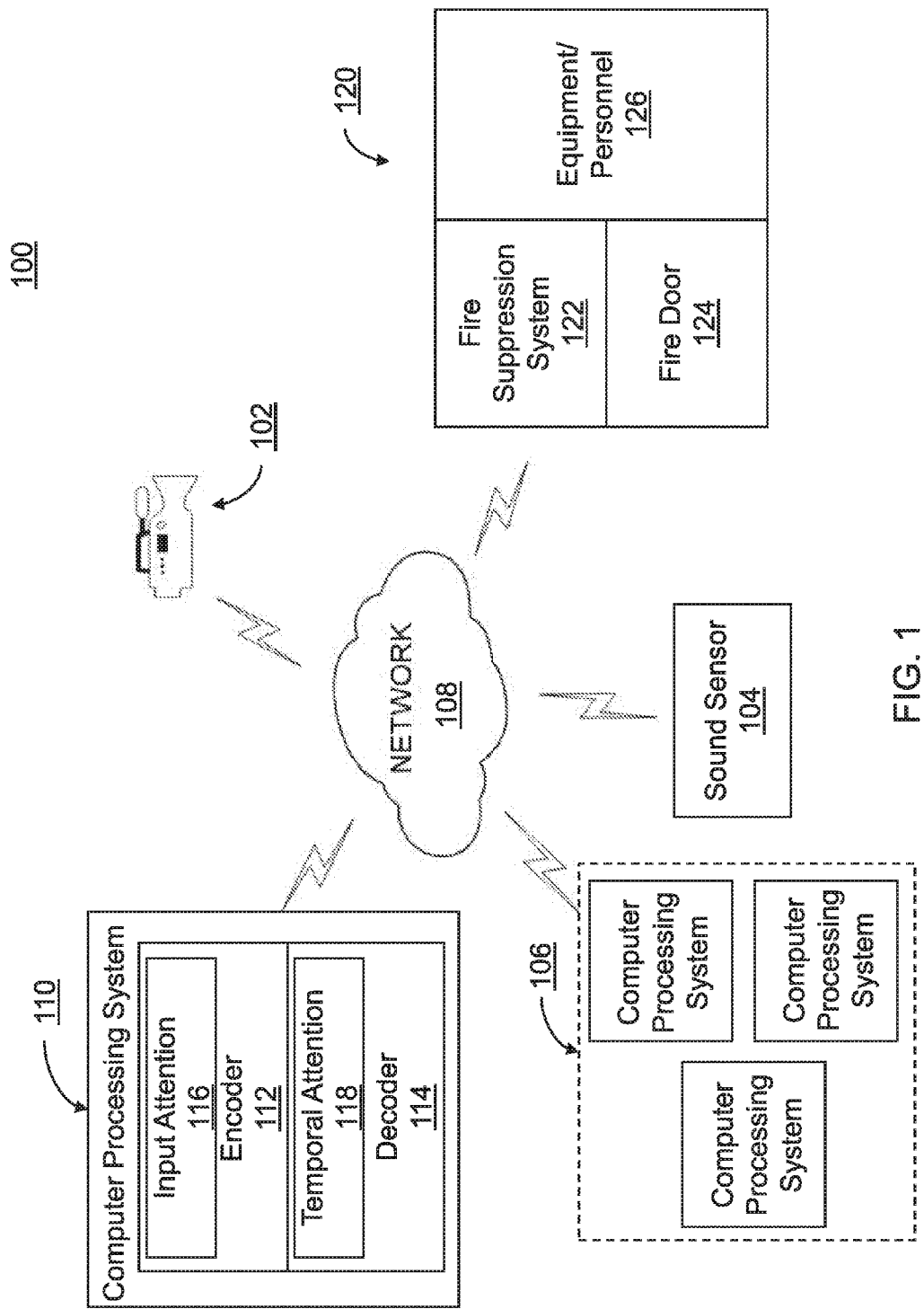
FIG. 1 is a schematic illustrating a dual-stage attention-based recurrent neural network (DA-RNN) hazardous anomaly detection system including a fire suppression system, in accordance with an embodiment of the present invention.

In accordance with the present principles, systems and methods are provided for the accurate approximation of time series prediction with multivariate time series having exogenous driving input series. In one embodiment, a dual-stage attention based recurrent neural network (DA-RNN) is described. The DA-RNN offers improved performance over conventional non-linear autroregressive exogenous models for long term time series by better capturing long term temporal dependencies, building more accurate models, and resisting noise. This improvement may be achieved by including a two stage structure wherein the first stage is an encoder stage and the second stage is a decoder stage.

The encoder of the DA-RNN in accordance with the present embodiment, can include an input attention mechanism before encoding. The input attention mechanism may take the form of a multilayer perceptron, or other suitable attention mechanism. By including an input attention mechanism in the encoder stage of the DA-RNN of the present embodiment, the DA-RNN can adaptively prioritize particular relevant input features at each timestamp that have greater effect on accurate prediction, rather than giving the same importance to all of the input features.

Data processed by the input attention mechanism of the DA-RNN is then encoded and passed to a temporal attention mechanism before decoding. The temporal attention mechanism may be employed to concurrently select relevant encoded data across all previous timestamps. The output of the temporal attention mechanism may then be decoded and used to generate the predicted output.

The two stage DA-RNN may be jointly trained end-to-end with backpropagation. Through training, the dual attention structure in accordance with the aspects of the present invention, is able to capture long-term dependencies and adaptively select the most relevant input features for making predictions, thus enabling more accurate predictions that are easy to interpret and robust to noise.

For example, the DA-RNN may be employed within a computing system to forecast weather behavior based on known weather data by extracting relevant weather data, encoding that weather data, and then re-extracting and decoding the encoded data to produce a model. The model will correlate the known weather data to weather behavior, thus enabling predictions of future weather behavior. Similarly, the DA-RNN could be used in a computer system for forecasting financial markets where the DA-RNN will produce a model correlating, for example, economic data with stock behavior, thus enabling the prediction of stock prices.

Because of the two attention mechanisms, the computing system described above will be able to automatically place more importance on relevant data, and less importance on irrelevant data, resulting in an improvement in the quality of the data. The input attention can prioritize the most relevant types of data, while the temporal attention can prioritize the most relevant times for which data is provided. By introducing attention mechanisms to the learning and modeling processes, the computing system can generate more parameters from a given data set than other neural networks for more complex processing of the data. Accordingly, the system can filter out noise more effectively, and generate more accurate models for prediction. All of these improvements may result from introducing the input and temporal attention capabilities to the computing system.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a block diagram of an exemplary embodiment of a video workplace safety system 100 is shown. The workplace safety system 100 is representative of a computer network to which aspects of the present invention can be applied. The elements shown relative to FIG. 1 are set forth for the sake of illustration. However, it is to be appreciated that the present embodiments can be applied to other network configurations and other operational environments as readily contemplated by one of ordinary skill in the art given the teachings provided herein.

The workplace safety system 100 includes an imaging sensor 102 such as a video camera, a computer processing system or server 110, a plurality of computer processing systems or servers 106 and a sound sensor 104. The workplace safety system 100 further includes a workplace environment 120 including at least one safety system or device 122 such as a fire suppression system, a controlled system(s), machine(s), and/or device(s) (individually and collectively denoted by the reference numeral 124 and hereinafter referred to as "controlled system, machine, and/ or device") and other equipment and personnel 126. For the sake of simplicity and illustration, the preceding elements are shown in singular form, but can be readily extended to more than one of any of the preceding elements as readily appreciated by one of ordinary skill in the art given the teachings of the present invention provided herein. The computer processing system 110 can be any type of computer processing system including, but not limited to, servers, desktops, laptops, tablets, smart phones, media playback devices, and so forth, depending upon the particular implementation. For the sake of illustration, the computer processing system computer processing system is a server.

The imaging sensor 104 is configured to capture one or more video sequences that are processed by the computer processing system 110. The computer processing system 110 is configured to perform dual-stage attention based deep learning using a dual-stage attention-based recurrent neural network (DA-RNN) with auxiliary tasks for video-based anomaly detection. By employing, a dual attention system as described herein, greater accuracy and speed can be achieved for identifying events in a security environment. The computer processing system 110 is configured to form observations by identifying and tracking a subject (e.g.; personnel, conditions, equipment, etc.), actions by the subject, and objects on which the actions are taken. The computer processing system 110 then generates a set of driving series from the observations through time.

The DA-RNN of the computer processing system 110 is configured, through training, to apply input attention using an input attention mechanism 116 to adaptively extract relevant observations of the driving series for encoding with an encoder 112. Upon extraction, the observations are then encoded into hidden states. The hidden states are then extracted using temporal attention with a temporal attention mechanism 118, at which point they are then decoded using a decoder 114. The decoded information is then used to generate predictions of future actions of the subject that is both accurate and efficient. As a result, when the observations include an anomaly that may pose a safety risk (e.g., hazard or safety risk to personnel or equipment), the computer processing system 110 including the DA-RNN will predict the safety risk upon processing the anomaly.

Moreover, the computer processing system 110 is configured to perform an action (e.g., a control action) on the controlled system, machine, and/or device 124 responsive to detecting the anomaly corresponding to the safety risk. Such action can include, but is not limited to, one or more of: powering down the controlled system, machine, and/or device 122 or a portion thereof; powering down, e.g., a system, machine, and/or a device that is affected by another device, opening a valve to relieve excessive pressure, locking an automatic fire door, and so forth. As is evident to one of ordinary skill in the art, the action taken is dependent upon the type of anomaly and the controlled system, machine, and/or device 124 to which the action is applied.

The safety system or device 122 can implement the aforementioned or other action. The safety system or device 122 can be a shut off switch, a fire suppression system, an overpressure valve, and so forth. As is readily appreciated by one of ordinary skill in the art, the particular safety system or device 122 used depends upon the particular implementation to which the system 100 is applied. Hence, the safety system or device 122 can be located within or proximate to or remote from the controlled system, region or area, machine, and/or device 124, depending upon the particular implementation.

The DA-RNN adaptively extracts observations relevant to the hazardous anomaly by using dual-stage attention mechanisms. By adaptively extracting the relevant observations, and thus the relevant feature series from, for example, safety system videos, the dual-stage attention mechanisms of the DA-RNN can ensure the most relevant information is processed. A safety system or device 122 that is controlled by a DA-RNN not only improves prediction accuracy through accurate feature series extraction, but it also improves the capture of long-term dependencies and reduction in noise.

In the embodiment shown in FIG. 1, the elements thereof are interconnected by a network(s) 108. In particular, the network 108 is depicted as a wireless network. However, in other embodiments, other types of connections (e.g., wired, etc.) can also be used. Additionally, one or more elements in FIG. 1 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of workplace safety system 100 are readily determined by one of ordinary skill in the art, given the present teachings provided herein.

Figure 2:
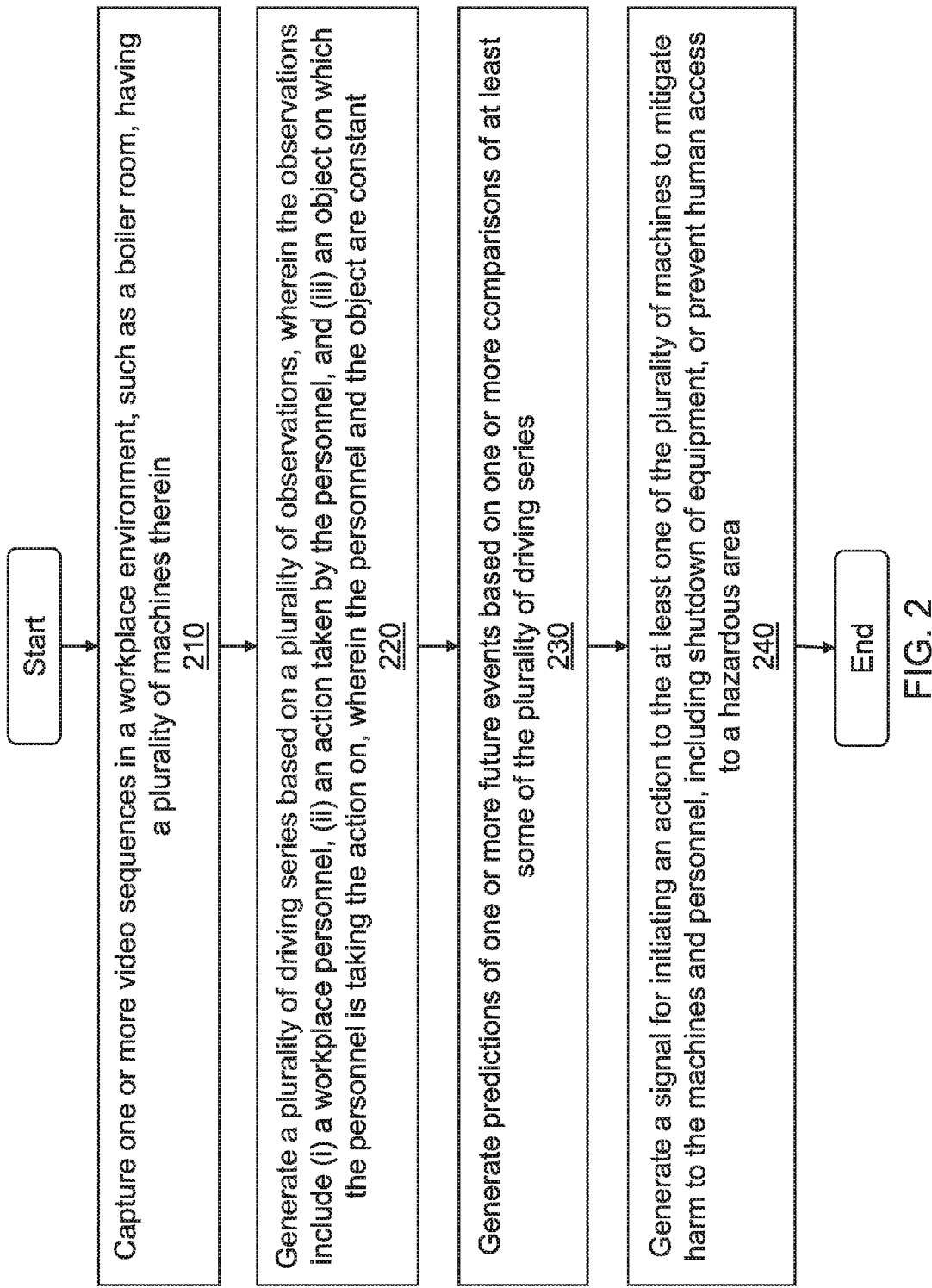
FIG. 2 is a block/flow diagraph illustrating a DA-RNN to predict a hazardous workplace environments a take action to mitigate harm, in accordance with an embodiment of the present invention.

Referring to FIG. 2, an example of workplace safety system operation is illustratively shown. The DA-RNN is deployed within an industrial facility and is trained to monitor hazardous conditions. In particular, in power generation facilities utilizing fossil fuel boilers, the DA-RNN is deployed to monitor the boiler room personnel and to take immediate action, based on observed personnel actions, to prevent harm to human life or significant property damage. The monitoring system is operated by the DA-RNN and captures one or more video sequences in a workplace environment, such as a boiler room, having a plurality of machines therein (refer to these as block in flow chart or block diagrams) 210. The DA-RNN is trained to generate a plurality of driving series based on a plurality of observations, wherein the observations include (i) a workplace personnel, (ii) an action taken by the personnel, and (iii) an object on which the personnel is taking the action on, wherein the personnel and the object are constant 220 and, thereafter, generate predictions of one or more future events based on one or more comparisons of at least some of the plurality of driving series 230. Based on the predictions, the DA-RNN will take automatic action to mitigate harm to the machines and personnel, including shutdown of equipment, or prevent human access to a hazardous area 240. Automatic actions can include shutting down a boiler or furnace, automatic shutdown of equipment or preventing human access to hazardous areas.

Figure 3:
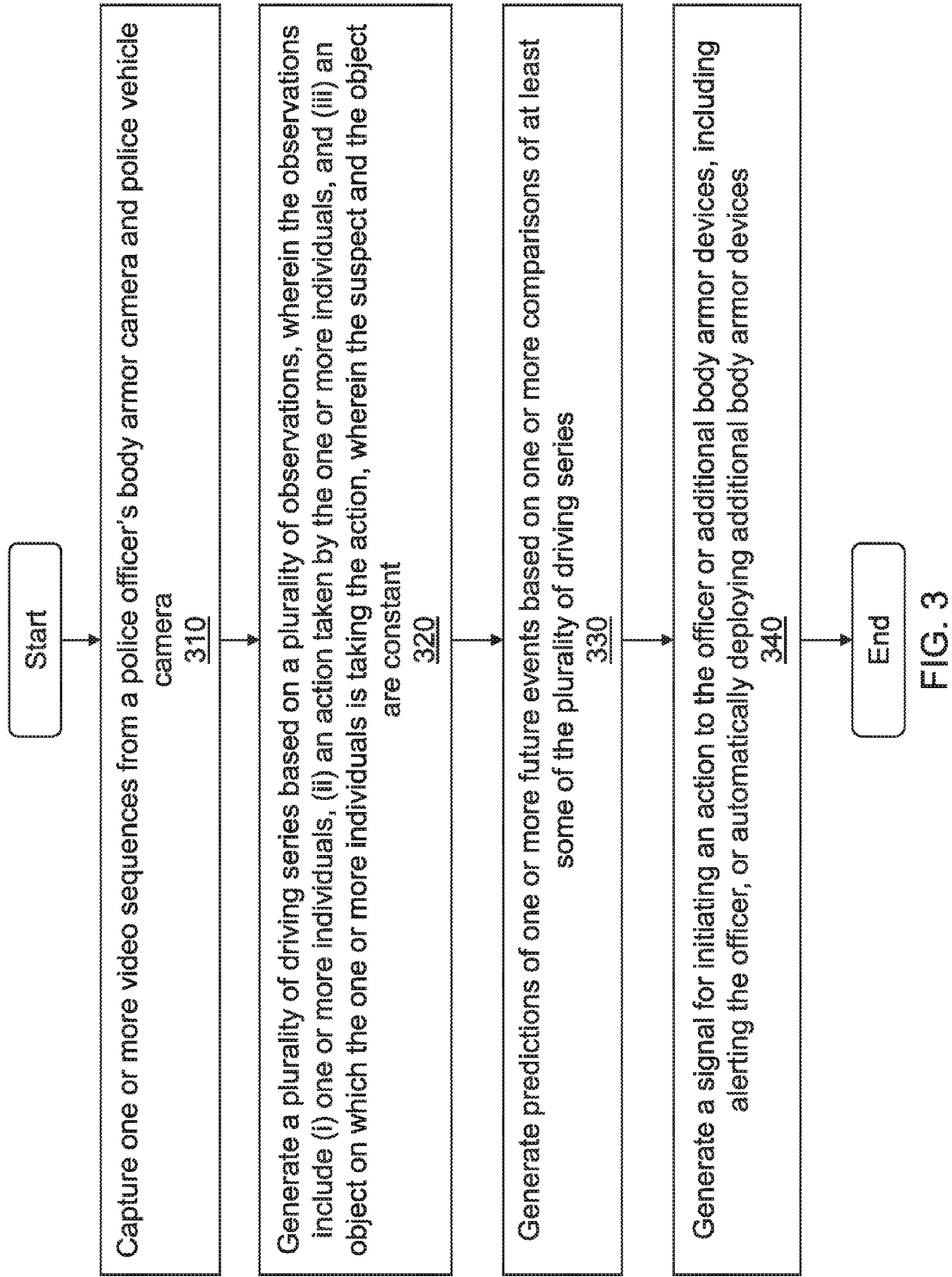
FIG. 3 is a block/flow diagraph illustrating a DA-RNN to predict a police suspects actions and protect a police officer, in accordance with an embodiment of the present invention.

In another embodiment as illustrated in FIG. 3, the DA-RNN is deployed as an automatic police safety protection system. The police safety protection system is operated by the DA-RNN and receives image data from the police officer's body armor camera and police vehicle camera 310. The DA-RNN is trained to predict future events based on actions of an individual or individuals 330 by generating a plurality of driving series based on a plurality of observations, including observations of (i) one or more individuals, (ii) an action taken by the one or more individuals, and (iii) an object on which the one or more individuals is taking the action 320. The DA-RNN is configured to automatically mitigate a health or safety risk to the police officers based upon the predictions of the DA-RNN. Automatic actions can include deploying additional body armor devices for the police officers, alerting police officers of the predicted event, and providing annunciation of the predicted event at remote locations 340.

In another embodiment, the DA-RNN is deployed in police hostage negotiation situations, wherein the DA-RNN is trained to predict the likelihood of future events given the immediate actions of an individual. The DA-RNN learns to predict the occurrence of future events, and is automatically configured to take immediate action to ensure safety. Automatic actions taken can include automatically securing magnetic door locks in a facility, alerting police officers of the predicted event, and providing annunciation of the predicted event at remote locations.

Other environments in which to deploy a DA-RNN based video safety system, as described above, are contemplated. For example, to maintain security at public or private events, to maintain security in stores, and to maintain safety during recreational activities.

Figure 4:
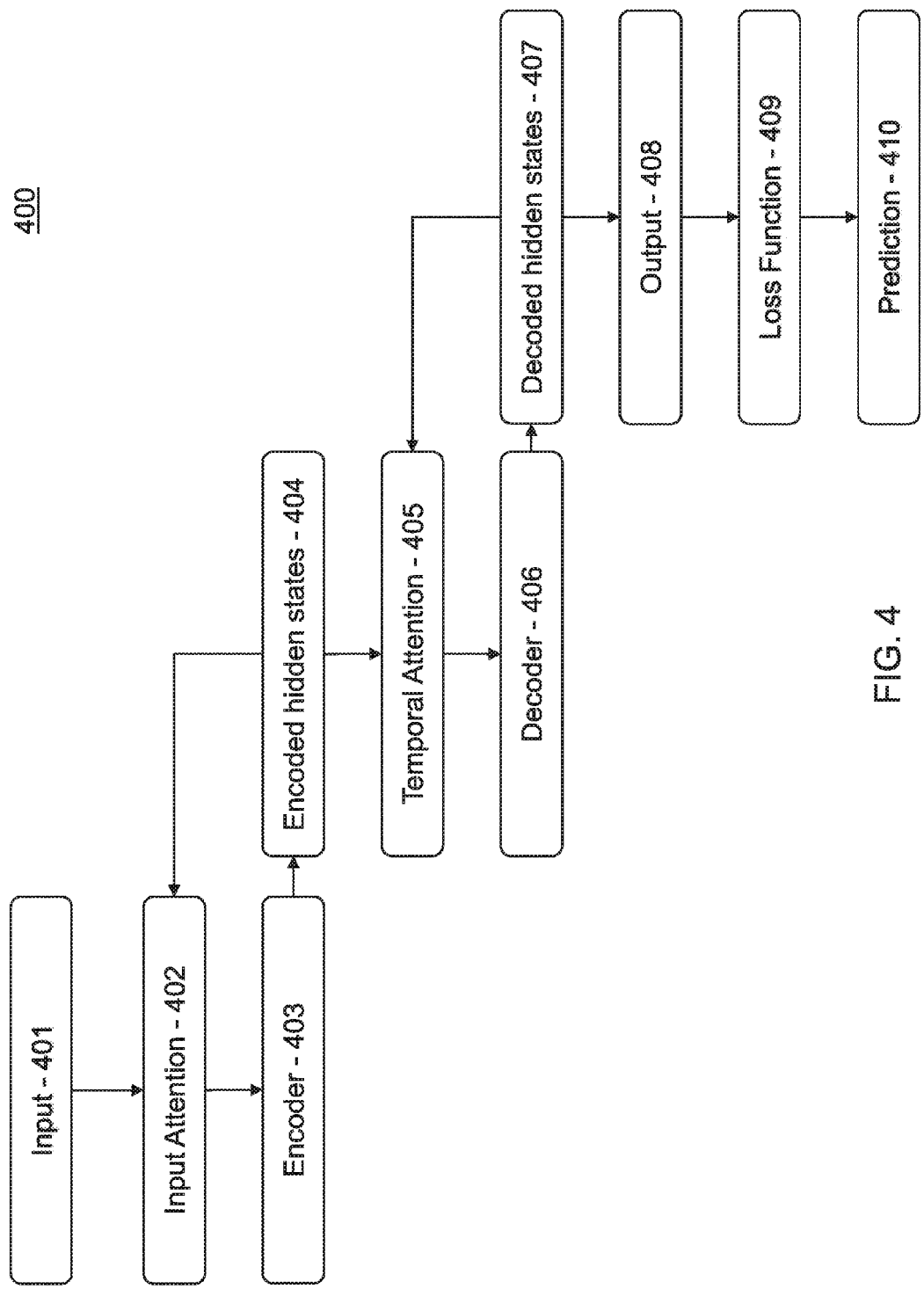
FIG. 4 is a block/flow diagram illustrating a high-level method for a dual-stage attention-based recurrent neural network, in accordance with the present principles.

Referring now to FIG. 4, a high-level method for dual-stage attention based neural networks is illustratively depicted in accordance with one embodiment of the present principles.

In one embodiment, a dual-stage attention-based recurrent neural network (DA-RNN) 400 includes an input 401. In one embodiment, the input 401 includes time series data including at least one driving series. The driving series represents time series data of multiple types (e.g. data for each of a variety of weather conditions, or data corresponding to each of a plurality of subjects and objects depicted in a video sequence). Each driving series includes at least one input feature. An input feature may represent a given data point at a given point in time (eg, the temperature on a particular day or the month, or a position of a person at a particular time in a video sequence). Each driving series may of the input 401 may include a plurality of input features for across a time period, with a given time denoted by a timestamp t. Other examples of possible time series data for use by the DA-RNN 400 may include stock market data, speech data, written language data for machine translation, medical data, communication network traffic data, and any other suitable data.

The DA-RNN 400 processes the input 401 with an input attention mechanism 402 to weight input features before encoding into encoded hidden states 404, where hidden states represent an intermediary stage in the processing of the data. The input attention mechanism 402 may be hardware or software configured to weight the input features by adaptively extract relevant driving series at each timestamp before encoding, thus prioritizing more types of data that is more relevant to the prediction. To accomplish the extraction, the input attention mechanism 402 evaluates the feature at a given timestamp of the input 401 and a hidden state 404 generated at a previous timestamp.

The selected relevant driving series are then provided to the encoder 403 which may encode the extracted driving series with a Long Short-Term Memory unit (LSTM), Gated Recurrent Unit (GRU) or other suitable model. The encoded extracted driving series forms the encoded hidden state 404 for the current timestamp. The encoded hidden states 404 include encoded information that may be used to affect subsequent hidden states 404 in time, and may be passed to the decoder 406 for producing an output.

The encoded hidden states 404 at all timestamps may be provided to a temporal attention mechanism 405. The temporal attention mechanism 405 then extracts relevant encoded hidden states 404 concurrently across all timestamps. Thus the most timestamps that are more relevant to the prediction are prioritized. The extraction is a function of all of the encoded hidden states 404 as well as a decoded hidden state 407 of a previous timestamp.

The extracted encoded hidden states 404 are then provided to a decoder 406 which decodes the extracted encoded hidden states 404 into decoded hidden states 407. The decoding is a function of a decoded hidden states 407 from a previous timestamp, an output from a previous timestamp and the extracted encoded hidden states 404. The decoding may be computed with a function including an LSTM, GRU or other suitable model.

An output 408 is generated from the decoded hidden states 407. The output 408 may be stored in memory or provided to a loss function 409 to be optimized. The loss function 409 may include a mean square error function or other suitable error function. The final output from the loss function may take the form of a prediction 410 and may be stored in memory or displayed to a user. The prediction may be, for example, a future weather behavior such as a storm or a tornado based on the input weather conditions, or the future occurrence of a hazard such as a fire based on the actions of the objects in the video sequence.

Figure 5:
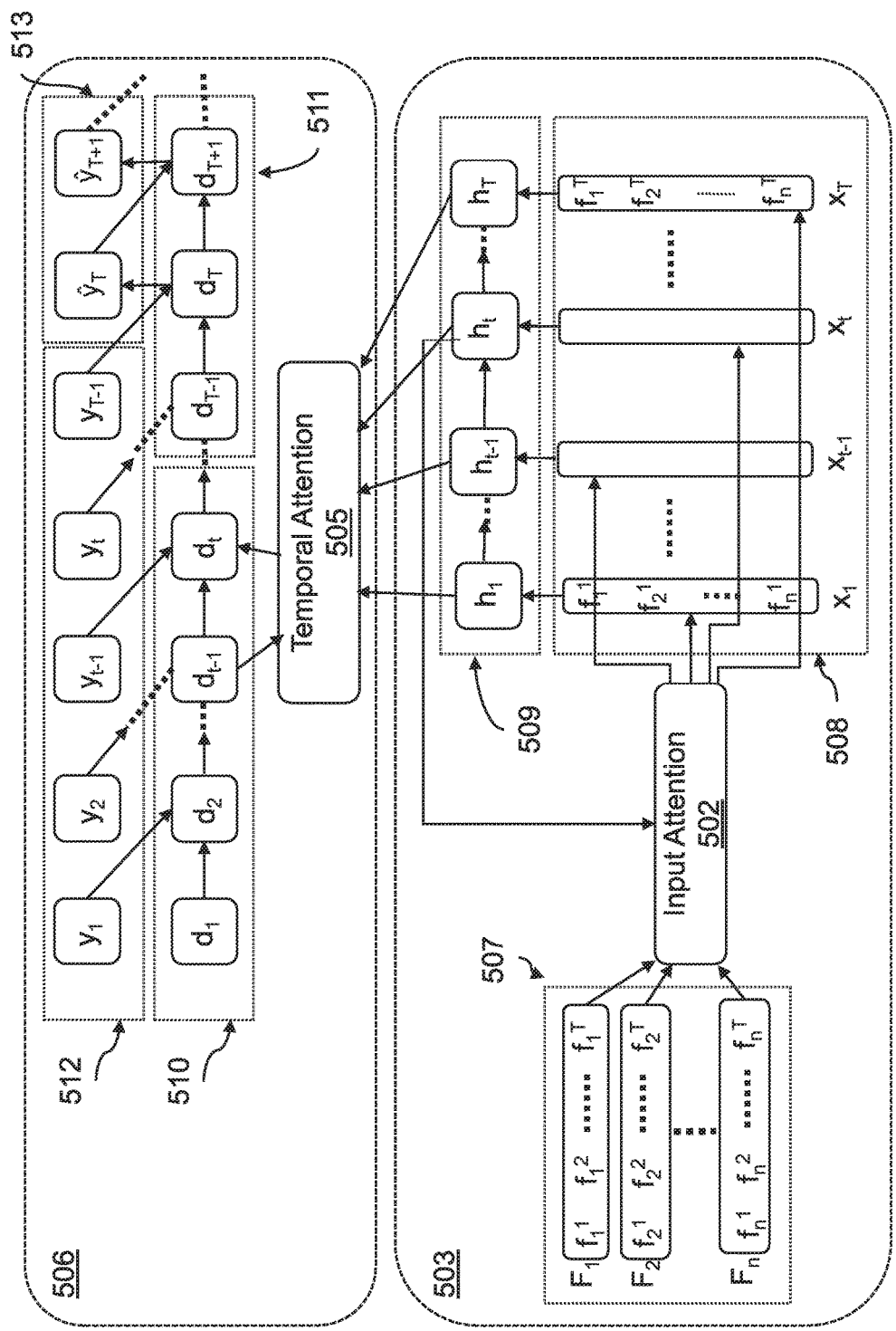
FIG. 5 is a flow diagram illustrating a method for a dual-stage attention-based recurrent neural network, in accordance with the present principles.

Referring now to FIG. 5, a method for a dual-stage attention-based recurrent neural network is illustratively depicted in accordance with an embodiment of the present principles.

The DA-RNN of the present embodiment may approximate a non-linear function F for, as an example, forecasting weather based on weather condition history or predicting hazards based on video data, using a recurrent neural network including an encoder 503 and a decoder 506, modeling a relationship between driving series 507 with known output 512. The encoder 503 encodes hidden states 509 from driving series 507, and the decoder 506 decodes the encoded hidden states 509 to generate decoded hidden states 510. The decoded hidden states 513 may generate predicted outputs 513.

The encoder 503 generates encoded hidden states 509 as an intermediary stage of the DA-RNN by employing at least an input attention mechanism 502. The input attention mechanism 502 adaptively extracts relevant input features of the driving series 507 to produce extracted feature series 508 at each timestamp of the series (1 through T, where t signifies an arbitrary timestamp and T signifies the last timestamp of the input series). A given extracted feature series may take the form of a vector containing a variety of data at a given timestamp, such as each type of weather data on a particular day, or each object in a video sequence at a particular moment in time. To generate an extracted feature series 508 at a current timestamp $x_t$, the input attention mechanism 502 refers to an encoded hidden state 509 of a previous timestamp $h_{t-1}$ (where t−1 is the timestamp immediately prior to the arbitrary timestamp) and each input feature of the current timestamp in each driving series 507 ($f_1^t$ through $f_n^t$). The encoder 503 may then encode the extracted feature series 508 of the current timestamp to generate an encoded hidden state 509 for the current timestamp $h_t$.

The decoder 506 generates a predicted output 513 by decoding encoded hidden states 509 to decoded hidden states 510. The decoder employs a temporal attention mechanism 505 which adaptively extracts relevant encoded hidden states 509 to generate each decoded hidden state 510. The decoded hidden state 510 may be an intermediary stage of the decoder that a user will not observe but is used to determine a prediction.

The temporal attention mechanism 505 extracts encoded hidden states 509 across all timestamps by referencing a decoded hidden state 510 of the previous timestamp $d_{t-1}$. The decoder 506 may then decode the extracted encoded hidden states 509 to generate a decoded hidden state 510 for the current timestamp $d_t$ by referring to a known output 512 or a predicted output 513 from the previous timestamp $y_{t-1}$ as well as the decoded hidden state 510 of the previous timestamp $d_{t-1}$. The decoder may generate a predicted decoded hidden state 511 for a future timestamp $d_T$ through this process. The predicted decoded hidden state 511 may predict a predicted output 513 for the future timestamp $\hat{y}_T$ by referring to a known output 512 or predicted output 513 from a previous timestamp $y_{T-1}$. The predicted output 513 may be, for example, a predicted weather pattern or condition, such as a storm or a tornado, or it could be a prediction of a particular hazard occurring such as a fire.

Accordingly, the DA-RNN of the present embodiment may utilize an encoder and decoder with dual attention mechanisms to estimate a non-linear, multivariate model for making time-series predictions.

Figure 6:
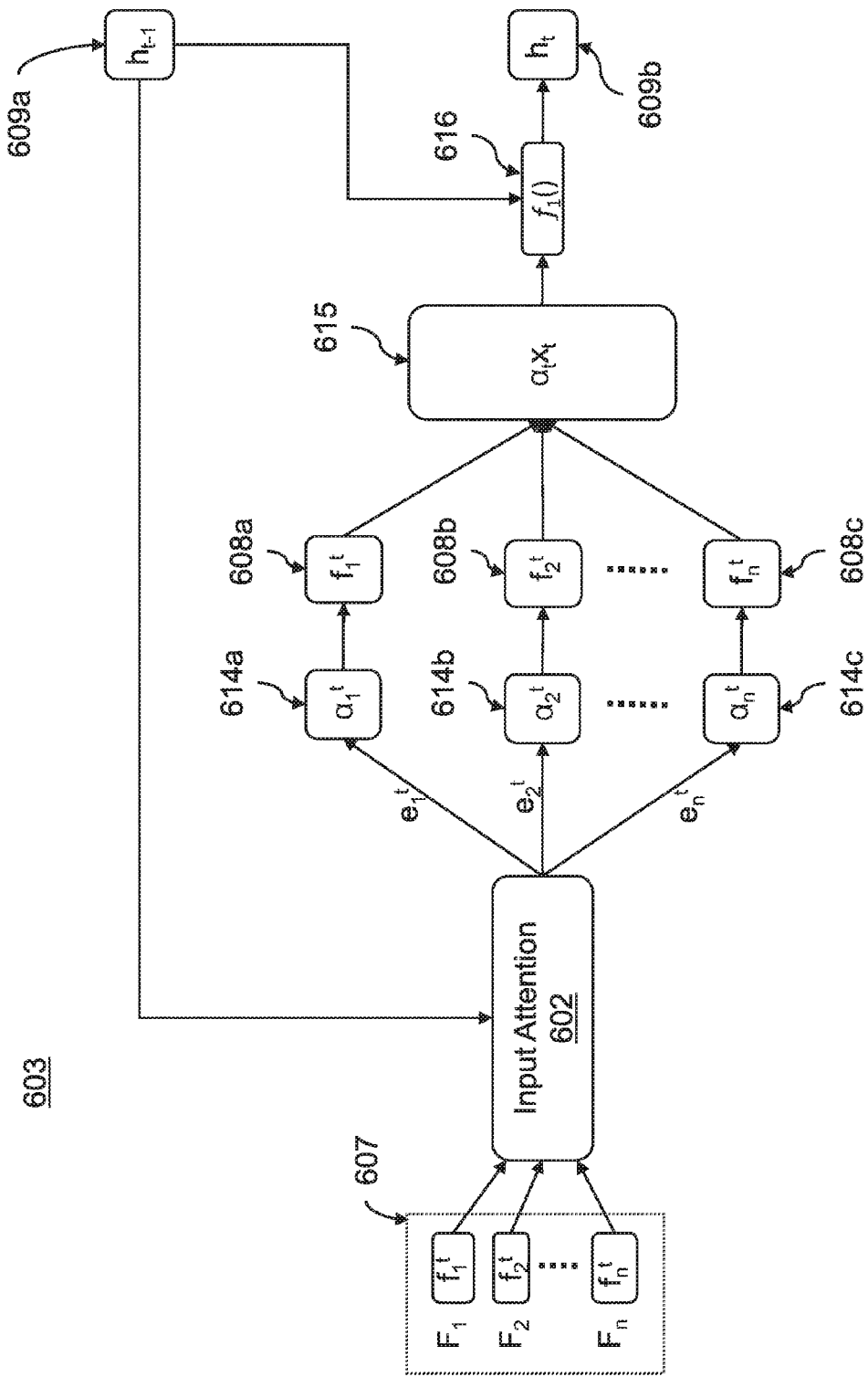
FIG. 6 is a flow diagram illustrating a method for encoding input in the encoder of a dual-stage attention-based recurrent neural network, in accordance with the present principles.

Referring now to FIG. 6, a method for encoding input in the encoder of a dual-stage attention-based recurrent neural network is illustratively depicted in accordance with an embodiment of the present principles.

The encoder 603 of the present embodiment determines an encoded hidden state 609b of a current timestamp t from input features of the current timestamp t of the driving series 607. The input attention mechanism 602 extracts relevant features by computing attention weights 614a, 614b and 614c corresponding to importance of each input feature at the current timestamp t (see, Formula 2 below). The encoder 603 applies the attention weights 614a, 614b and 614c to the input features 608a, 608b and 608c respectively, thus generating an adaptively extracted feature series 615. The adaptively extracted feature series 615 may then be encoded with a non-linear activation function 616 to generate the encoded hidden state 609b.

To determine the attention weights 614a-c, the input attention mechanism 602 may reference the input features of the driving series 607 and an encoded hidden state from a previous timestamp (t−1) 609a. The input attention mechanism 602 may be a feed forward network, which enables joint training of hidden states with other components of the RNN. Additionally, the input attention mechanism 602 may include a deterministic attention model, such as a multilayer perceptron to first calculate an unnormalized attention factor $e_k^t$ for each input feature $f_n^t$, according to formula (1) below:

$$e_k^t = v_e^T \tan h(W_e h_{t-1} + U_e x^k) \quad \text{Formula (1)}$$

where t is the current timestamp, k denotes the number of the driving series 607 (i.e., feature $f_1^t$ from series $F_1$), and $v_e$, $W_e$ and $U_e$ are parameters to learn. By applying a softmax function to $e_k^t$, such as that of Formula (2), an attention weight 614a-c is determined for each input feature 608a-c.

$$\alpha_k^t = \frac{\exp(e_t^k)}{\sum_{i=1}^{n} \exp(e_t^i)} \quad \text{Formula (2)}$$

The softmax function of formula (2) ensures that the sum of the attention weights for a given timestamp 614a-c is equal to one, thus normalizing each unnormalized attention factor $e_k^t$. The attention weights 614a-c may then be applied to each of the corresponding input features 608a-c, respectively, to generate an extracted feature series vector 615.

The encoder 603 applies a non-linear activation function 616, such as LSTM or GRU that refers to the extracted feature series vector 615 as well as the encoded hidden state from the previous timestamp 609a. The non-linear activation function 616 thus generates an encoded hidden state for the current timestamp 609b.

Figure 7:
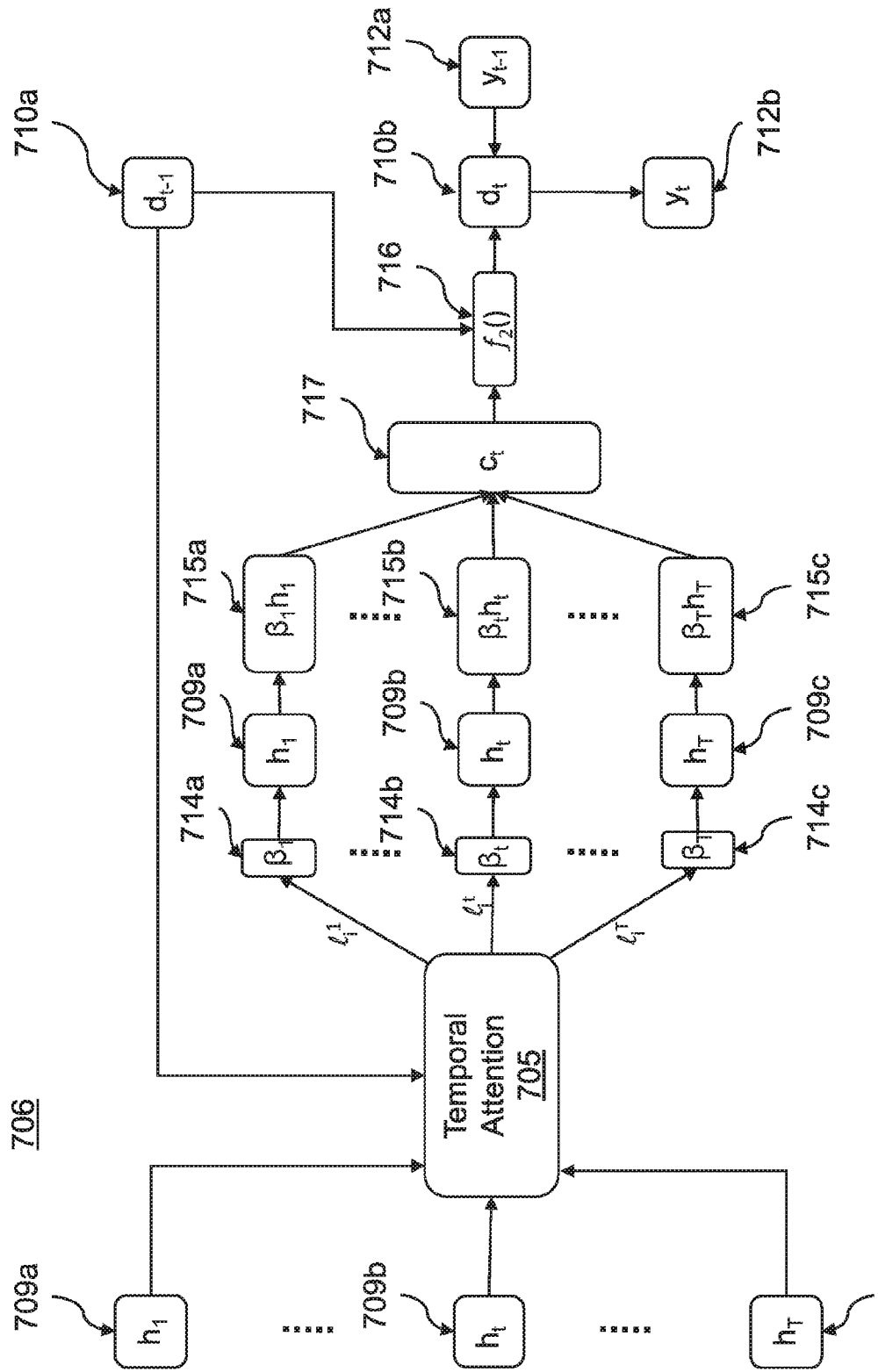
FIG. 7 is a flow diagram illustrating a method for decoding selected input in the decoder of a dual-stage attention-based recurrent neural network, in accordance with the present principles.

Referring now to FIG. 7, a method for decoding extracted input by the decoder of a dual-stage attention-based recurrent neural network is illustratively depicted in accordance with an embodiment of the present principles.

The decoder 706 of the present embodiment determines an output of a current timestamp (t) 712b from a decoded hidden state of the current timestamp (t) 710b from encoded hidden states across all timestamps 709a-c. The temporal attention mechanism 705 extracts relevant encoded hidden states 709a-c by computing temporal attention weights 714a, 714b and 714c corresponding to importance of each encoded hidden state 709a-c respectively. The decoder 705 applies the temporal attention weights 714a-c to each encoded hidden state 709a-c respectively, thus generating an adaptively extracted context vector 717. The context vector 717 may then be decoded with a non-linear activation function 716 to generate the decoded hidden state 710b, which is used to generate the output 712b. The output 712b may be a known output or a predicted output.

To determine the temporal attention weights 714a-c, the temporal attention mechanism 705 refers to the encoded hidden states 709a-c across all timestamps and a decoded hidden state from a previous timestamp (t−1) 710a. The temporal attention mechanism 705 may be a feed forward network, which enables joint training of hidden states with other components of the RNN. Additionally, the temporal attention mechanism 705 may include a deterministic attention model, such as a multilayer perceptron. The temporal attention mechanism 705 may first calculate an unnormalized attention factor $l_k^t$ for each encoded hidden state 709a-c, according to formula (3) below:

$$l_i^t = v_d^T \tan h(W_d d_{t-1} + U_d h^i) \quad \text{Formula (3)}$$

where t refers to the timestamp, i refers to the referenced encoded hidden state 709a-c, and $v_d$, $W_d$ and $U_d$ are parameters to learn. By applying a softmax function to $l_k^t$, such as that of Formula (4), the temporal attention weights 714a-c is determined for each encoded hidden state 709a-c.

$$\beta_i^t = \frac{\exp(l_t^i)}{\sum_{j=1}^{n} \exp(l_t^j)} \quad \text{Formula (4)}$$

The temporal attention weights 714a-c are then applied to the encoded hidden states 709a-c to produce weighted encoded hidden states 715a-c.

A context vector 717 is generated by taking a sum of the weighted encoded hidden states 715a-c.

A decoded hidden state for the current timestamp (t) 710b is computed through the use of a non-linear activation function 716. The non-linear activation function 716 may be an LSTM or a GRU or other suitable activation function. The decoded hidden state for the current timestamp (t) 709b is computed with reference to the context vector 717, the decoded hidden state from the previous timestamp (t−1) 710a, and an output from the previous timestamp (t−1) 712a.

The decoded hidden state for the current timestamp (t) 710b produces an output for the current timestamp (t) 712b. The relationship between input and output for an unknown non-linear function F is thus approximated. The approximation may be used to generate a predicted output $\hat{y}_T$ according to Formula (5) below:

$$\hat{y}_T = v_o^T(W_o[d_T; C_T] + b_w) + b_v \quad \text{Formula (5)}$$

where $v_o^T$ is a concatenation of the weights, $[d_T; C_T]$ is a concatenation of the decoder hidden state and the context vector, $W_o$ and $b_w$ are parameters to be learned to map the concatenation to the size of the decoded hidden states and $b_v$ is a bias to be learned.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A video camera system for video-based safety prediction, the device comprising:
   an imaging sensor configured to capture one or more video sequences in an environment having a plurality of safety concerns therein; and
   a processor configured to:
      generate a plurality of driving series based on a plurality of observations from the one or more video sequences;
      generate predictions of one or more future events based on the observations using a dual-stage attention-based recurrent neural network (DA-RNN), wherein the DA-RNN includes;
         an input attention mechanism to extract relevant driving series, an encoder to encode the extracted relevant driving series into hidden states, a temporal attention mechanism to extract relevant hidden states, and a decoder to decode the relevant hidden states; and
      generate a signal for initiating an action to at least one of a plurality of machines to mitigate harm to at least one item.

2. The video camera system of claim 1, further comprising a network adapter configured to transmit the signal to an object selected from the group consisting of (i) the at least one of the plurality of machines, and (ii) a safety device associated with the at least one of the plurality of machines.

3. The video camera system of claim 1, further comprising a hardware port for receiving a wired communication medium over which the signal is transmitted to an object selected from the group consisting of (i) the at least one of the plurality of machines, and (ii) a safety device associated with the at least one of the plurality of machines.

4. The video camera system of claim 1, wherein the processor is further configured to pre-train the DA-RNN using a plurality of auxiliary tasks relating to potentially hazardous conditions which guide training and learning of the DA-RNN.

5. The video camera system of claim 1, wherein the prediction of future events potentially affecting the workplace safety are supervised predictions of future events potentially affecting the workplace safety.

6. The video camera system of claim 1, wherein the observations include (i) a subject, (ii) an action taken by the subject, and (iii) an object on which the subject is taking the action on, wherein the subject and object are constant.

7. The video camera system of claim 1, further comprising a sound capturing device for sound-based workplace safety, the device comprising at least one sound sensor configured to capture one or more sounds in the workplace environment having the plurality of machines therein.

8. The video camera system of claim 7, further comprising a voice recognition module, configured to interpret human speech using the sound capturing device.

9. The video camera system of claim 7, further comprising a vibration interpretation module, configured to interpret one or more vibrations corresponding to imminent mechanical failure of rotating equipment and provide a warning based on the one or more vibrations.

10. The video camera system of claim 7, further comprising optical character recognition for interpreting text.

11. A video camera system for performing video-based workplace safety, the system comprising:
    a plurality of video cameras, each including:
       at least one imaging sensor configured to capture one or more video sequences in a workplace environment having a plurality of machines therein;
    a processor configured to:
       generate a plurality of driving series based on a plurality of observations, wherein the observations include (i) a subject, (ii) an action taken by the subject, and (iii) an object on which the subject is taking the action on, wherein the subject and object are constant;
       generate predictions of future events including future fire hazards based on the observations using a dual-stage attention-based recurrent neural network (DA-RNN), wherein the DA-RNN includes;
          an input attention mechanism to extract relevant driving series using an input attention mechanism, an encoder to encode the extracted relevant driving series into hidden states, a temporal attention mechanism to extract relevant hidden states, and a decoder to decode the relevant hidden states; and
       generate a signal for initiating an action to at least one of the plurality of machines in response to the predictions.

12. The video camera system of claim 11, further comprising a network adapter configured to transmit the signal to an object selected from the group consisting of (i) the at least one of the plurality of machines, and (ii) a safety device associated with the at least one of the plurality of machines.

13. The video camera system of claim 11, further comprising a hardware port for receiving a wired communication medium over which the signal is transmitted to an object selected from the group consisting of (i) the at least one of the plurality of machines, and (ii) a safety device associated with the at least one of the plurality of machines.

14. The video camera system of claim 11, wherein the processor is further configured to pre-train the DA-RNN using a plurality of auxiliary tasks relating to potentially hazardous conditions which guide training and learning of the DA-RNN.

15. The video camera system of claim 11, wherein the predictions of future events potentially affecting the workplace safety are supervised predictions of future events potentially affecting the workplace safety.

16. The video camera system of claim 11, wherein the processor is further configured to fine-tune parameters of the DA-RNN using back-propagation.

17. The video camera system of claim 11, wherein the signal causes actions to prevent harm to at least one item or personnel.

18. The video camera system of claim 11, further comprising a sound capturing device for sound-based workplace safety, the device comprising at least one sound sensor configured to capture one or more sounds in the workplace environment having the plurality of machines therein.

19. The video camera system of claim 11 further comprising a voice recognition module, configured to interpret human speech using the sound capturing device.

20. The video camera system of claim 11 further comprising a vibration interpretation module, configured to interpret vibrations corresponding to imminent mechanical failure of rotating equipment and provide a warning.

* * * * *